Nov. 25, 1969   E. T. CLINTON ETAL   3,479,680
CASTER SEAL
Filed May 8, 1967

INVENTORS.
Edwin T. Clinton
Michael Kramcsak Jr.

By Morton Lesser
Attorney

United States Patent Office 3,479,680
Patented Nov. 25, 1969

3,479,680
CASTER SEAL
Edwin T. Clinton, Redding Ridge, and Michael Kramcsak, Jr., Bridgeport, Conn., assignors to Stewart-Warner Corporation, Chicago, Ill., a corporation of Virginia
Filed May 8, 1967, Ser. No. 636,938
Int. Cl. B60b 33/00
U.S. Cl. 16—21                     1 Claim

ABSTRACT OF THE DISCLOSURE

An annular resilient external seal for the bearing portion of a caster and having upper and lower engagement with the stationary and rotatable members of the caster.

---

A typical form of caster includes a horn with a circular crown, a circular bearing plate rigidly secured to the crown and having an upstanding annular rim flange defining a lower ball race at its upper side, an attaching plate overlying and extending peripherally beyond the bearing plate and defining an annular upper ball race at its underside, and balls engaged between the upper and lower ball races. This type of caster is mechanically adapted for general use in various trucks, carts, and the like. However, it has the disadvantages that lubricant can flow outwardly of the race-defining members and foreign material such as food particles can accumulate in the pockets of the caster. For these reasons, the caster is unsuitable for use in trucks or carts employed in restaurants, hospitals or other locations where sanitary conditions must be maintained.

Among the objects of the present invention are to provide a caster seal that encloses the race-defining members to prevent or restrain the flow of lubricant radially outwardly thereof, that encloses the pockets of the caster to prevent the accumulation of foreign material therein, that in one embodiment is engaged between the bearing plate and the attaching plate to eliminate shimmy, and that may be conveniently assembled about the caster.

Now in order to acquaint those skilled in the art with the manner of constructing and using caster seals in accordance with the principles of the present invention, there will be described in connection with the accompanying drawing preferred embodiments of the invention.

Figure 1:
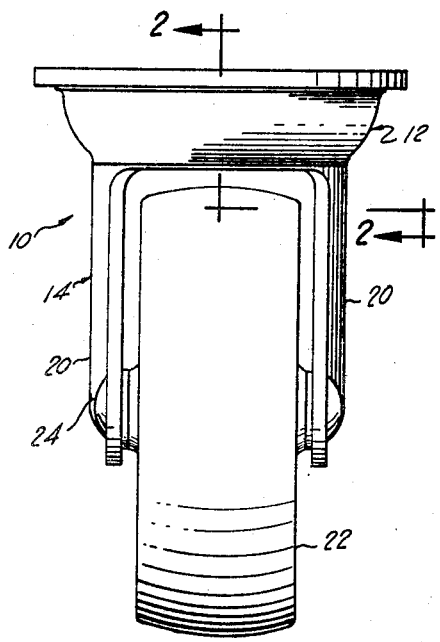
Figure 2:
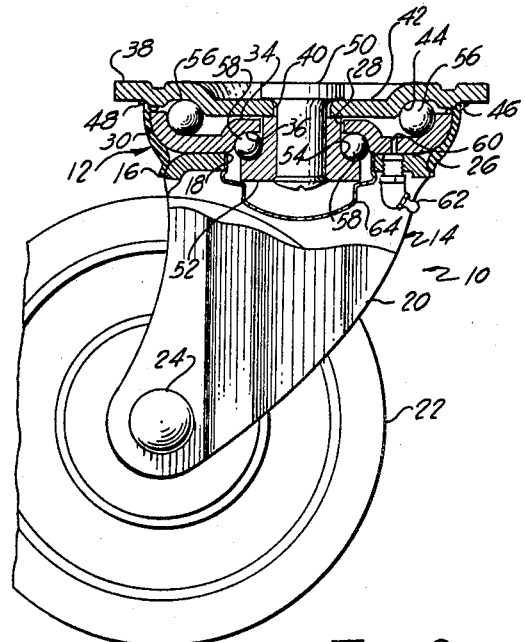
Figure 3:
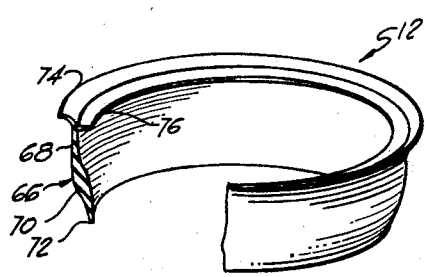
Figure 4:
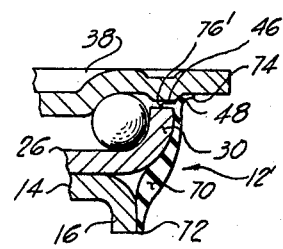

In the drawing:
FIGURE 1 is an end elevational view of a caster incorporating one embodiment of the seal of the present invention;
FIGURE 2 is a vertical sectional view taken substantially along the line 2—2 in FIGURE 1, looking in the direction indicated by the arrows;
FIGURE 3 is a perspective view of the caster seal of the present invention, with a portion thereof being broken away; and
FIGURE 4 is a fragmentary sectional view of a caster incorporating a modified embodiment of the seal of the present invention.

Referring now to FIGURES 1 and 2, there is shown a caster 10 having incorporated therewith one embodiment of the novel annular seal member 12 of the present invention. The caster 10 includes a horn 14 comprised of a circular crown 16 formed with a central aperture 18 and depending side leg portions 20 between which a caster wheel 22 is mounted upon an axle 24.

A circular bearing plate 26, having a central aperture 28, is rigidly secured, as by projection welding, to the horn crown 16. The bearing plate 26 is provided with an upstanding annular rim flange 30 which defines a lower outer ball race 32 at its upper side, and is provided with an inner upwardly offset annular flange portion 34 which defines an upper inner ball race 36.

Overlying the bearing plate 26 is an attaching plate 38 having a central aperture 40 formed in a central depressed annular portion 42 which defines an upper outer ball race 44 at its underside. The attaching plate 38, which may be of rectangular or any other suitable shape, extends peripherally beyond the bearing plate 26, and is formed with a downwardly offset annular rib 46 which defines an annuular arcuate surface 48.

A king pin 50 extends downwardly through the central aperture 40 of the attaching plate 38 and is suitably secured therein as by welding. Secured to the lower end of the king pin 50, as by welding, is a bearing collar 52 which defines a lower inner ball race 54. As will be appreciated, a bolt and nut arrangement or a rivet may be used in place of the king pin 50. An outer row of balls 56 are interposed in engagement with the outer ball races 32 and 44, while an inner row of balls 58 are interposed in engagement with the inner ball races 36 and 54. Lubricant passageway means 60 is formed through the horn crown 16 and the bearing plate 26, and the outer end thereof is provided with a suitable pressure fitting 62. A cup-shaped shield 64 is press fitted into the central aperture 18 of the horn crown 16 and serves to enclose the same.

The seal member 12 as shown in FIGURE 3, has a body portion 66 which includes an upper section 68 of uniform thickness, and a lower inwardly curved section 70 having an intermediate region of enlarged thickness and terminating in a lower lip 72 offset radially inwardly of the upper section 68. The seal 12 further comprises an upper outwardly flared wing portion 74 and an upper inwardly directed rib portion 76. The seal, which has a uniform cross section, is fabricated of a resilient material such as neoprene rubber.

In the assembly of the caster 10, the seal 12 is stretched over the horn 14 into the position shown in FIGURE 2 before the caster wheel 22 and axle 24 are mounted to the horn. The seal 12 is approximately 5 percent smaller than the parts over while it is stretched. The resulting tension in conjunction with the varying thickness of the cross-section of the seal establish forces to locate and maintain the seal for proper functioning. These forces are in direct proportion to the amount of stretch and thickness of the seal. For optimum performance, a slightly different percentage of stretch is provided in the section around the rib portion 76 than in the section 70.

In the assembled position of the seal 12, the wing portion 74 has sliding sealing engagement with the surface 48 of the attaching plate 38, while the thickened section 70 provides an inwardly acting tension that holds the lower lip 72 in sealing engagement with the horn crown 16. Ordinarily, the inward tension would also tend to pull the seal downwardly and thus separate the wing portion 74 from the plate surface 48. However, such action is prevented by the engagement of the rib portion 76 with the top edge of the bearing plate 26. Thus, the rib portion 76 and the section 70 together serve to locate the seal on the curved periphery of the rim flange 30.

The rib portion 76 not only serves as a locator, but also, because it is frictionally engaged between the upper edge of the rim flange 30 and the lower face of the plate rib 46, serves as a seal to prevent the flow of lubricant radially outwardly of the race-defining members of the caster 10. The friction seal further serves to eliminate shimmy in the caster 10 during rotation of the horn 14 and bearing plate 26 relative to the attaching plate 38. In addition, the lower seal section 70 extends across and partially into the pocket or area between the horn crown 16 and the bearing plate 26 whereby to prevent the accumlation therein of foreign material such as food particles. As will be appreciated, a caster incorporating the seal member 12 has universal application and is especially useful in circumstances requiring rigid sanitary conditions.

The modified embodiment of seal 12' shown in FIGURE 4 is substantially the same as the seal 12 except that the rib portion 76' is slightly thinner than the rib portion 76 so that it contacts only the top edge of the plate flange 30. As thus constructed and arranged, the rib portion 76' serves to locate the seal 12'; and, although the rib 76' does not function as a complete seal in the same manner as the rib 76, the loss of grease from the caster 10 is nevertheless restrained. By utilizing the rib 76' instead of the rib 76, precision fabrication of the seal 12' is avoided and hence manufacturing costs are minimized. For most field requirements, the prevention of the entrance of foreign material about the area of the caster crown and the restraint of the escape of grease therefrom, as effected by the seal 12', offers adequate sealing.

While there has been shown and described preferred embodiments of the present invention, it will be understood by those skilled in the art that various rearrangements and modifications may be made therein without departing from the spirit and scope of the invention.

We claim:
1. A caster comprising a horn with a circular crown having one outer edge diameter, a circular bearing plate rigidly secured to the upper radial surface of said crown and having an upstanding annular rim flange defining a lower ball race at its upper side, said rim flange having an outer surface diameter greater than said crown one diameter, an attaching plate overlying said bearing plate and extending peripherally beyond the bearing plate rim flange and defining an annular upper ball race at its underside with said rim flange projecting toward said attaching plate, balls engaged between the upper and lower ball races, an annular resilient seal member having only open ends and of progressively smaller diameter from one upper end engaging against the under side of said attaching plate to the other lower end overlying the outer edge of said crown with the diameter of respective axial portions of said seal being normally substantially five percent less than the diameter of the rim flange and crown whereby respective portions of said seal are expanded radially to engage over said rim flange outer surface and said crown outer edge respectively, a radially inwardly extending annular rib portion integrally formed on said seal member adjacent one end of said seal and extending between said attaching plate and said bearing plate to prevent axial slippage of said seal member from said rim flange and over said crown outer edge, an outwardly flared annular wing portion integrally formed on said seal adjacent said one edge for sealing engagement with one side of said attaching plate, and a radially inwardly curved thickened wall section formed on said seal intermediate said ends for engagement between said bearing plate and said crown.

References Cited
UNITED STATES PATENTS

| | | | |
|---|---|---|---|
| 3,399,421 | 9/1968 | Crawford | 16—26 |
| 2,787,804 | 4/1967 | Noelting et al. | 16—21 |

BOBBY R. GAY, Primary Examiner

DORIS L. TROUTMAN, Assistant Examiner